United States Patent [19]

Gilmore II

[11] Patent Number: 4,940,210
[45] Date of Patent: Jul. 10, 1990

[54] BALL VALVE

[76] Inventor: Hugh L. Gilmore II, 9305 Glynn La., Beaumont, Tex. 77707

[21] Appl. No.: 172,478

[22] Filed: Mar. 24, 1988

[51] Int. Cl.⁵ ............................................. F16K 5/20
[52] U.S. Cl. .................................... 251/160; 251/188
[58] Field of Search ............... 251/160, 161, 167, 188, 251/192, 215, 279, 330, 315; 137/614.11

[56] References Cited

U.S. PATENT DOCUMENTS

| | | | |
|---|---|---|---|
| 1,639,743 | 8/1927 | Marscheider | 137/614.11 |
| 1,803,773 | 5/1931 | Schmidt et al. | 251/160 |
| 2,246,764 | 6/1941 | Seamark | 251/188 |
| 2,283,259 | 5/1942 | Johnson | 251/160 |
| 2,290,332 | 7/1942 | Johnson | 251/160 |
| 2,847,180 | 8/1958 | Ludeman | 251/188 X |
| 3,403,886 | 10/1968 | Barker | 251/188 X |

FOREIGN PATENT DOCUMENTS

| | | | |
|---|---|---|---|
| 496387 | 4/1930 | Fed. Rep. of Germany | 137/614.11 |
| 1311126 | 10/1962 | France | 251/161 |
| 1529484 | 5/1968 | France | 251/188 |
| 568015 | 10/1957 | Italy | 251/188 |

Primary Examiner—John Fox
Attorney, Agent, or Firm—Dodge, Bush & Moseley

[57] ABSTRACT

A new and improved valve apparatus and method of operating same that moves a flow closure assembly between open and closed positions with a minimum of frictional resistance while effecting a forcible engagement with both upstream and downstream valve seats when in the closed position. The preferred ball-type flow closure assembly is formed of two pivoted sections that are forcibly moved axially or tilted to sealingly engage the longitudinally spaced valve seats to provide upstream and downstream sealing by the valve in moving between an intermediate position and the closed position. The opening to closing movement is effected by rotating the valve actuator stem through an arc slightly greater than a quarter turn to provide a fast response operation. The valve actuator further includes a two part guide means which effects tilting of the ball sections only after or before rotational movement to insure that the ball is released from sealing engagement with both seats by only axial movement.

9 Claims, 4 Drawing Sheets

4,940,210

BALL VALVE

BACKGROUND OF THE INVENTION

1. Field of the Invention

The present invention relates to the field of fluid flow control valves and more particularly a valve having a movable closure that effects sealing engagement with the valve seat ring during only a small increment of the valve closure movement.

2. Background Art

Because the present invention is described in the context of a ball-type valve, the prior art will also be primarily discussed in that same context. It being understood that the present invention is defined and limited solely by the claims and not by the description.

The use of a rotating spherical plug or ball valve to control flow of fluid is known and old in the art. See for example U.S. Pat. No. 3,067,978 to Natho which discloses a conventional top entry ball valve. As disclosed therein, the rotatable ball closure element outer spherical surfaces establishes continuous sealing contact with fixed annular valve seats to control flow through the valve. The ball closure element is provided with a central flow port and is rotated through a quarter turn or 90° arc between open and closed positions to control the flow. When the ball flow port is substantially aligned with the valve housing flow passages the valve is operated to the open position providing a substantially unrestricted straight thru fluid flow path. When the ball is rotated to closed position the flow port traverse or perpendicular to the flow passage of the ball closure element serves as a stopper to block fluid communication and place the valve in the closed position. During operating movement of the ball, sliding contact occurs between the ball and seat providing the continuous seal.

To seal between the outer spherical surface of the ball member and the valve body for directing all flow through the ball flow port various forms of annular seat means may be employed. Known conventional seat means employed include both compression seats (Natho) and axial floating seats, such as disclosed in U.S. Pat. No. 3,214,135 to Hartmann. Floating seats may also be made pressure energized or responsive to enhance sealing. In sealingly engaging the ball to effect the continuous seals the seats are a source of great frictional resistance to operating rotation of the ball valve. Such frictional resistance is greatly increased by the force resulting from unbalanced contained fluid pressure when opening the valve. Such unbalanced pressure in the case of pressurized seats further increase the frictional contact force. In addition the large seat to ball contact pressure tends to score or otherwise damage the sealing faces during sliding contact which effectively destroys the seal therebetween.

Due to their relatively fast response or operation (90° rotation or quarter turn) and compact annular dimension relative to size of flow path advantage, ball valves have also been tailored for subsurface use in wells as well as in conventional valve housing. For example see the subsurface ball valve construction of U.S. Pat. Nos. 3,007,669 (Fredd) and 3,385,701 (Potts). These valves also have high frictional resistance by the seats to ball movement.

To reduce the frictional and pressure forces tending to prevent rotation of the ball and avoid damage to the valve seats and ball, a number of approaches have been attempted in the prior art.

One approach to reduce the force of the sliding contact has been to vent or equalize the pressure differential forces across the closed ball prior to commencing rotation to the open position. For examples of this pressure balancing or equalizing approach in the prior art see the following U.S. Pat. Nos.:

3,414,061, Nutter
3,993,136, Mott
4,293,038, Evans
4,332,267, Evans

Another approach has been to employ relatively complex operating mechanisms to effect rotational operation of the ball with a minimum of internal friction. Typical of such prior art mechanisms, which have not been widely accepted commercially due to their complexity and cost, are the following U.S. Pat. Nos.:

3,398,928, Fredd
4,210,207, McStavick et al
4,270,606, McStavick et al
4,508,173, Read Another approach, using selectively expandable valve closure members for engaging a fixed valve seat ring are also known. U.S. Pat. No. 3,497,180 to Ryey discloses such arrangement in a butterfly valve.

A variation to the Ryey approach applicable to ball valves has been to employ a segmented ball that moves axially as well as rotationally. For an example of such approach, see U.S. Pat. No. 1,803,773 to Schmidt et al. To control axial outward and inward movement of the plates or calottes carried by the ball to engage the fixed valve seats a relatively complex mechanical sequencing arrangement is employed. To operate the valve the stem is rotated 180° or half a circle to operate the valve. During half of this arc of the operating stem, the ball is locked to the stem for rotating the ball 90° or a quarter turn between positions. During the other 90° portion of the stem movement, the ball is unlocked from the stem and cams or eccentric guides are used to radially extend or retract the ball segment plates from sealing engagement with the fixed seats. Such complex operating arrangement is located in the flow passage where it is subject to malfunctioning and is costly to produce.

U.S. Pat. No. 2,711,302 to McWhorter discloses an operating mechanism for successively unseating, rotating and reseating a tapered plug closure assembly. In seating and unseating the tapered plug slides across the face of the valve seats which tends to score or damage the sealing capability of the seats.

Another approach has been to employ a ball closure or valve core member that is spaced from a single fixed valve seat with the ball moving longitudinally or axially in the final increment of movement when rotated into the closed position to sealingly engage the seat. Such an arrangement is disclosed in the following U.S. Pat. Nos.:

2,076,841, Heggem
2,516,947, Blevans
2,719,022, Blevans
3,473,554, King
3,512,546, King One significant drawback to this approach is that the valve is not reversible and can reliably control fluid flow in only a single direction.

Such an arrangement of interrupted seat engagement is also not limited to ball valves as it does have limited application to other types of valves. See for example U.S. Pat. No. 3,119,594 to Heggem entitled "Swing Gate Valve" in which the closure member is held open by fluid flow.

Each of the above mentioned U.S. patents is hereby fully incorporated by this specific reference as if they were set forth in full in this disclosure. While the forgoing patented inventions were improvements over the prior art, there remains an unsatisfied need for a relatively simple and inexpensive quick acting valve, controllable in operation and that effects both upstream and downstream sealing to control flow in either direction.

SUMMARY OF THE INVENTION

The present invention relates generally to the field of valves and more particularly to a valve of relatively simple construction having substantially the fast response of a quarter turn operated valve while avoiding the disadvantages of conventional prior art fast response valves.

The valve of the present invention includes a valve body having a central valve chamber and flow passageways extending therethrough. A rotatable flow closure assembly having a flow port formed therethrough is disposed in the valve housing chamber that communicates the aligned flow passage for controlling flow of fluid therethrough in response to 90° or quarter turn rotation of the closure assembly between the open and closed positions. A pair of fixed valve seats are carried by the valve housing in the flow passage adjacent the chamber and disposed on opposite sides of the valve closure element in a longitudinally or axially spaced relationship. The valve assembly rotates between an open and an intermediate positions without contacting the seats. The valve closure assembly is preferably of the ball-type formed by two pivoted portions or segments preferably identical in construction, which are radially expanded, tilted or longitudinally spaced after the ball assembly is rotated to the intermediate position for engaging and sealing with the valve seats in the closed position. After rotating the ball assembly from the open to the intermediate position an additional small rotational movement of the actuator stem separates or radially expands the valve segments to move the ball assembly to the closed position.

The method operation of the valve and ball assembly is effected by a relatively simple actuator mechanism having a rotatable base which carries a pair of relatively slidable guide members. Each of the guide members is operably connected to both the valve stem and a ball section for effecting both rotational and axial movement of the ball sections in response to rotation of the stem.

An object of the present invention is to provide a new and improved valve apparatus.

A further object of the present invention is to provide a new and improved method of operating a valve apparatus.

Yet another object of the present invention is to provide a new and improved valve apparatus and method of operation that is simple and rugged in construction and operation.

DESCRIPTION OF THE PREFERRED EMBODIMENT

Figure 1:
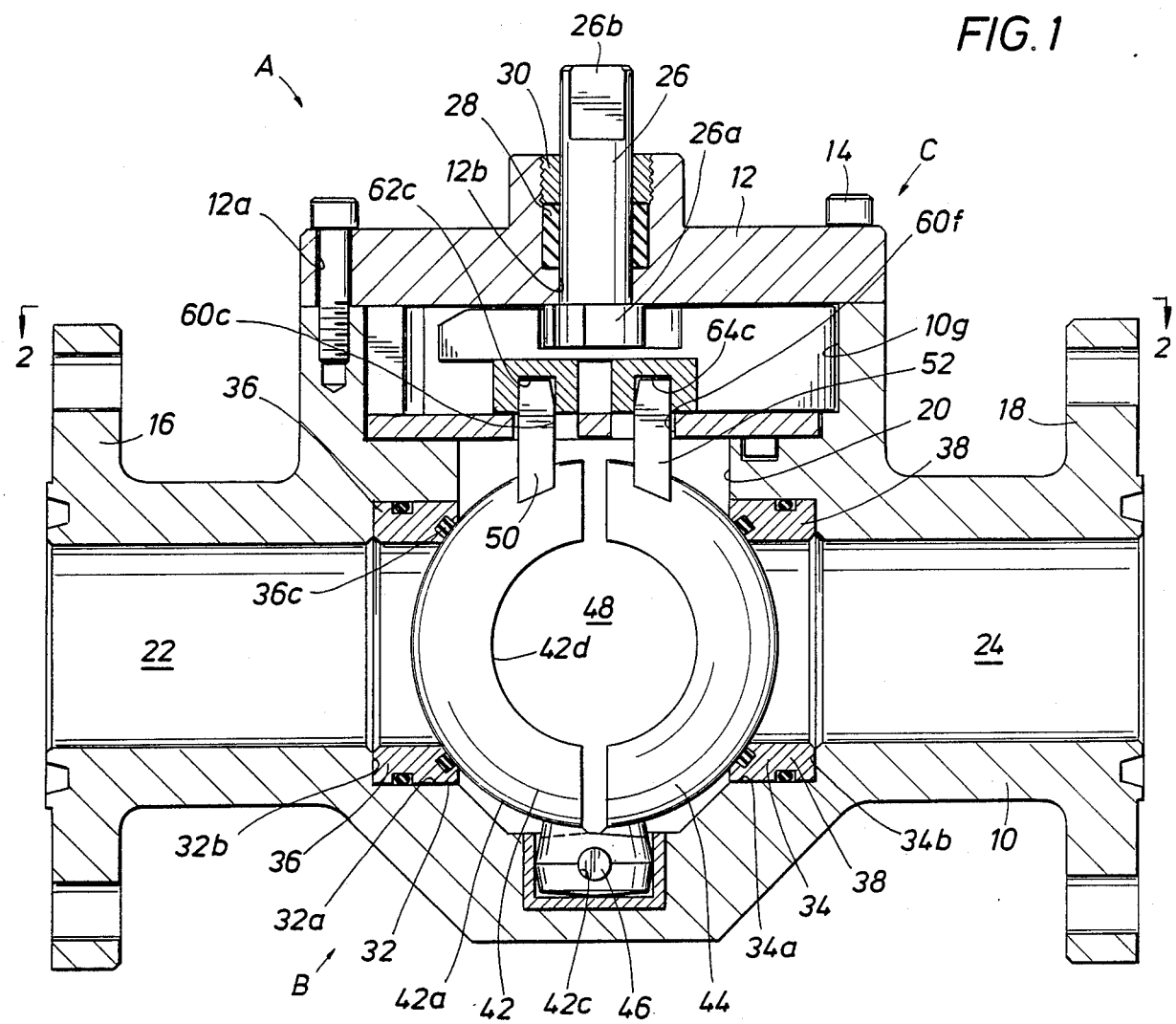
FIG. 1 is a side view, in section, of a valve apparatus of the present invention positioned in the closed position.

The valve apparatus of the present invention, generally designated A in the Figs., is illustrated in a form or embodiment similar to that of a conventional top entry ball valve. It will be understood that the present invention may take on a completely different appearance or form without departing from the present invention.

The apparatus A includes a valve housing or body 10 having a releasable top entry closure or bonnet 12 having a plurality of equi-circumferentially spaced bolt openings 12a. A corresponding plurality of equi-circumferentially spaced enlarged head machine bolts 14 extend through openings 12a and threadedly engage corresponding threaded openings 10a in the body 10 to releasably secure or clamp the bonnet 12 with the housing 10 in the conventional manner. Suitable known gasket or other sealing means (not illustrated) are employed to prevent fluid leakage between the bonnet 12 and housing 10 as is well known in the art. The top entry arrangement is preferred for ease of assembly and maintenance, but other forms of valve body construction may be employed when utilizing the present invention.

Flange end connections 16 and 18 are illustrated to provide the suitable, well known end connections for performing the function of connecting or mounting the valve body 10 in a suitable pipe or other flow conduit (not illustrated) in the well known manner. If desired, numerous other types of end connections may be employed in place of the flanged end connections 16 and 18 as is well known to those skilled in the art.

The valve body 10 includes an enclosed valve chamber 20 having the valve closure means, generally designated B, and actuator means, generally C, preferably disposed therein. Also formed in the valve body 10 are suitable fluid pressure containing flow passages 22 and 24 that communicate through and with the central valve chamber 20. Preferably, the flow passages 22 and 24 are formed of a common constant diameter for substantially their entire axial length and which are of a smaller size than the central chamber 20 to provide the contained fluid flow path. The flow passages 22 and 24 are also preferably arranged so that the longitudinal axes are aligned to provide a straight through flow path in association with the chamber 20 for the controlled fluid flow in either direction and which also minimizes the flow resistance provided by the valve. The bore closure means B is disposed in the chamber 20 and is operated or moved between the open, intermediate and closed positions by movement of a valve actuator means C which partially protrudes through the bonnet 12 to enable external controlled operation of the valve apparatus A in the known manner.

Figure 2:
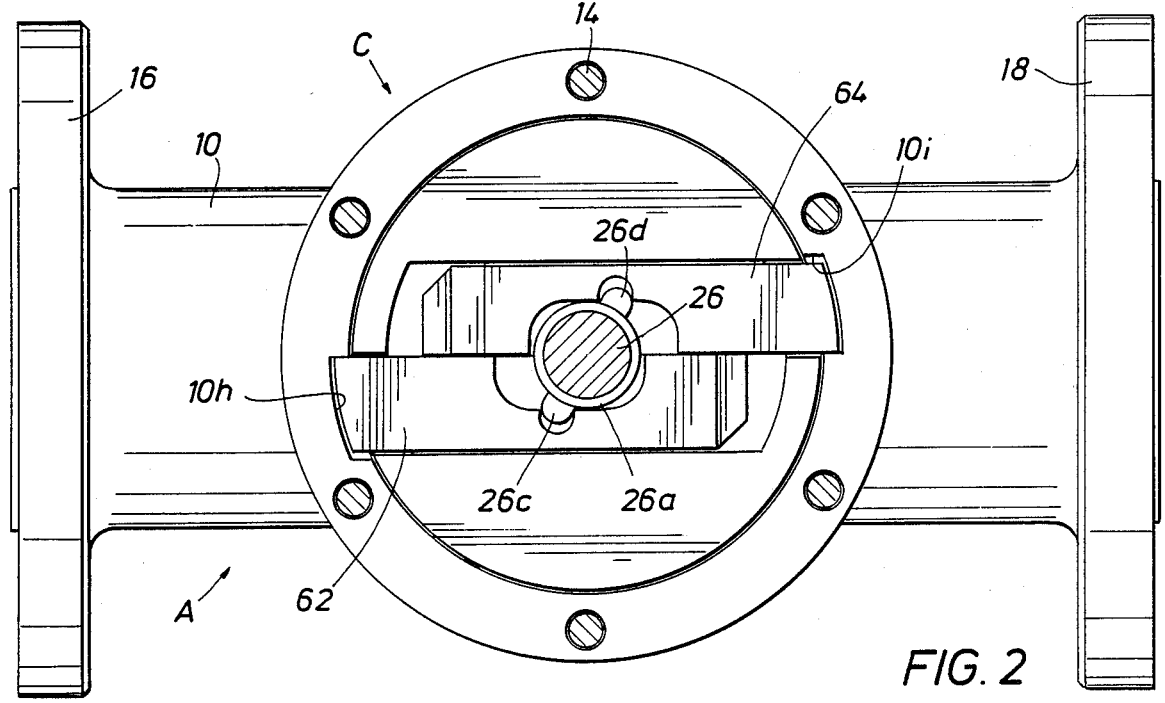
FIG. 2 is a view taken along line 2—2 of FIG. 1.

The bonnet 12 is also provided with a partially threaded center or concentric opening 12b which rotatably mounts or journals an actuator means stem 26 in the conventional manner. Suitable annular packing 28, disposed in opening 12b and adjustable secured by conventionally threaded retainer and follower ring 30, prevents leakage of fluid from the chamber 20 between the stem 26 and the bonnet 12 in the usual manner. The stem 26 is provided with an enlarged diameter portion 26a disposed in the valve chamber 20 which engages the bonnet 12 for retaining the stem 26 from being forced longitudinally through the bonnet opening 12a by fluid pressure in the chamber 20. In the event of failure of the stem packing 28, the retainer portion 26 will effect a temporary seal with the bonnet 12 to prevent uncontrolled leakage through opening 12b. To effect external operating rotation of the stem 26, a plurality of suitable flats 26b are formed on the stem 26 outside the chamber 20 to enable rotational operating movement to be imparted to the stem 26 from exteriorly of the valve apparatus A. Conventional lever actuators for manual operation or other known automatic valve operating apparatus may be mounted to the stem 26 at flats 26b for effecting controlled stem 26 rotation as desired. As best illustrated in FIG. 2, the enlarger diameter retainer portion 26a of the stem 26 is provided with a pair of oppositely facing radially extending lugs or ribs 26c and 26d (FIG. 2) for a purpose to be described later.

The valve body 10 is formed with a pair of oppositely facing annular seat pockets 32 and 34 (FIG. 1) surrounding flow passages 22 and 24, respectively, and which are located adjacent the valve chamber 20. Preferably, each the seat pockets 32 and 34 are formed by an enlarged constant diameter cylindrical surface 32a and 34a and a pocket abutment surface 32b and 34b that is disposed in a radial plane perpendicular to the cylindrical surface 32a and the longitudinal axis of the aligned flow passages 22 and 24. The seat pocket 34 is preferably formed substantially identical, but oppositely facing with the corresponding shoulder 34b facing chamber 20 (a reverse or mirror image) of pocket 32. While enlarged bore type seat pockets 32 and 34 are illustrated, it will be understood that other known forms or variations of seat pockets, such as annular slots facing the valve closure means B and formed in the valve body 10, may be employed without departing from the scope of the present invention.

Disposed in the seat pocket 32 is a suitable replaceable annular seat ring assembly 36 for sealing between the valve closure means B and the valve body 10 in the usual and conventional manner. An identical seat ring assembly 38 is positioned in the recess 34, but in an oppositely facing direction for also sealing with the valve closure means B. As the seat ring assemblies 36 and 38 are identical only the seat ring 36 will be described and like reference characters will be used to designate like parts. If desired the seats may be formed directly on the valve body 10 as well known in the art, but the use of field replaceable (press fit) fixed seats is preferred.

The seat ring assembly 36 includes a metal ring member 36a carrying an exterior O-ring 36b for sealing between the seat ring assembly 36 and the valve body 10. The seat ring assembly 36 also carries a suitable resilient face seal 36c for sealing with the valve closure means B. If desired the seat ring 36 may be provided with a limited range of axial movement (a floating type seat) that may or may not be line pressure responsive in operation. The metal ring member 36a may be formed of multiple concentric ring portions if desired for holding the face seal 36c or providing the limited axial or floating movement as well known in the art. In fact, those skilled in the art will know to substitute and modify the disclosed seat ring assemblies 36 and 38 with similar known seats.

Figure 7:
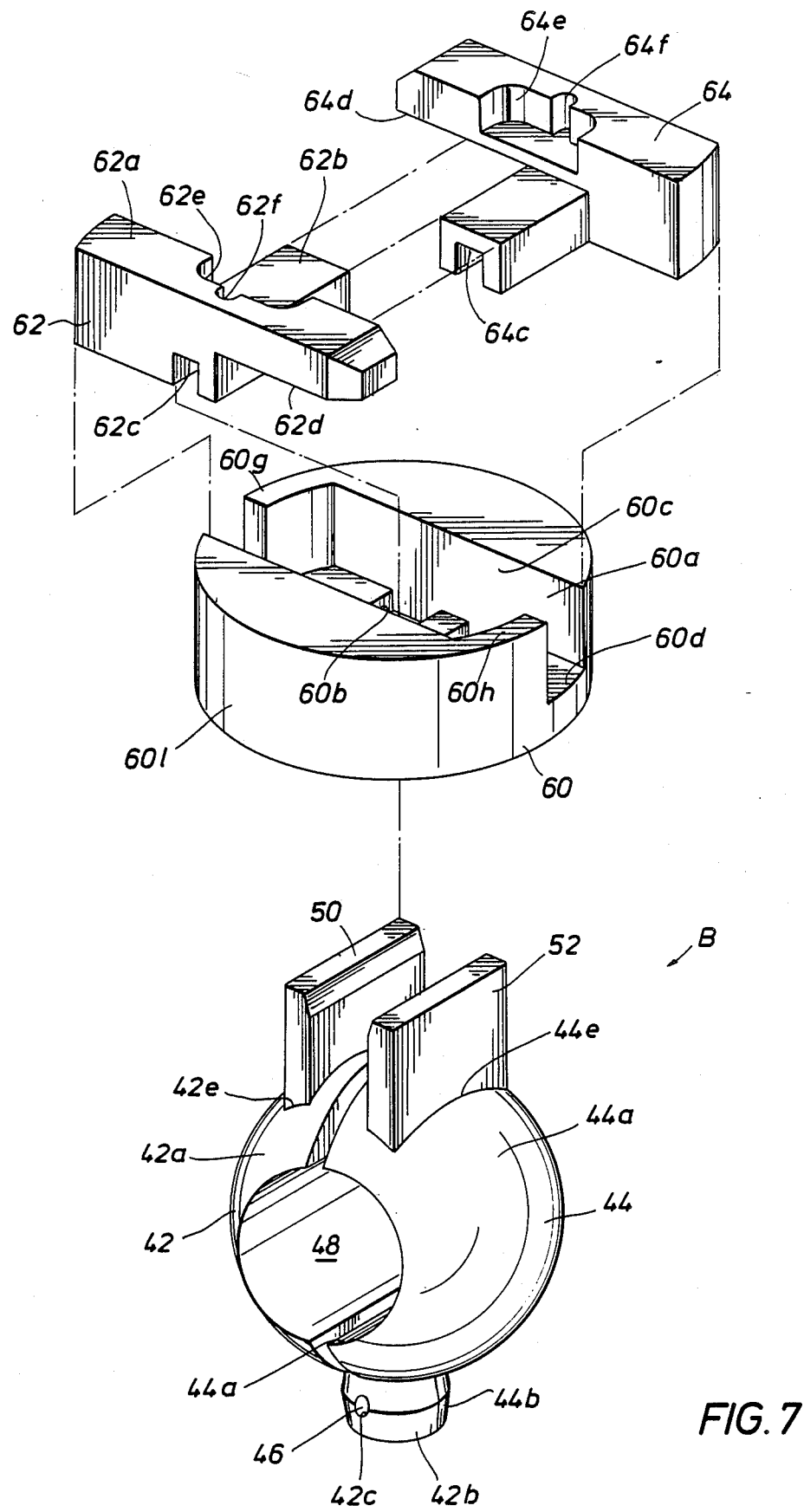
FIG. 7 is an exploded perspective view of the ball assembly and a portion of the actuator mechanism.

The valve closure means B is preferably in the form of a two piece ball assembly 40 having a first substantially hemisphere or ball shaped section or portion 42 and a second substantially hemisphere or ball shaped section or portion 44 that are pivotally connected by a pivot pin 46. As best illustrated in FIG. 7, the ball sections 42 and 44 are essentially identical in construction and operation and only the first ball section 42 need be described in detail. It will be understood that such description is equally applicable to the second ball section 44 which is fully interchangeable with the first ball section 42 and vice versa.

The ball section 42 includes an outer spherical surface 42a for sealing with the face seal 36c of the seat ring when the valve apparatus A is in the closed position (FIG. 1). The ball section 42 includes an outwardly projecting pivot lug 42b having an opening 42c formed therethrough to serve as a socket for a hinge provided by the connecting pivot pin 46.

By forming the lugs 42b slightly off center the identical ball section 42 may be employed interchangeably as section 44 for greatly reducing the cost of manufacturing the valve. However, other means known to those skilled in the art may be employed to operably connect the ball sections 42 and 44. The disclosed arrangement is preferred due to its simplicity.

The ball section 42 is also provided with a concave cylindrical surface 42d for forming half of a conventional central flow port 48 in the ball assembly 40. When the ball is in the open position the cylindrical surface 42d and 44d are disposed for aligning the central flow port 48 with the flow passageways 22 and 24 to provide substantially unrestricted straight through flow through the valve apparatus A. Preferably, the forming diameter of the surfaces 42d and 44d are substantially the same diameter forming the flow passages 22 and 24 to minimize flow resistance when in the open condition and provide a full opening valve apparatus A.

Figure 6:
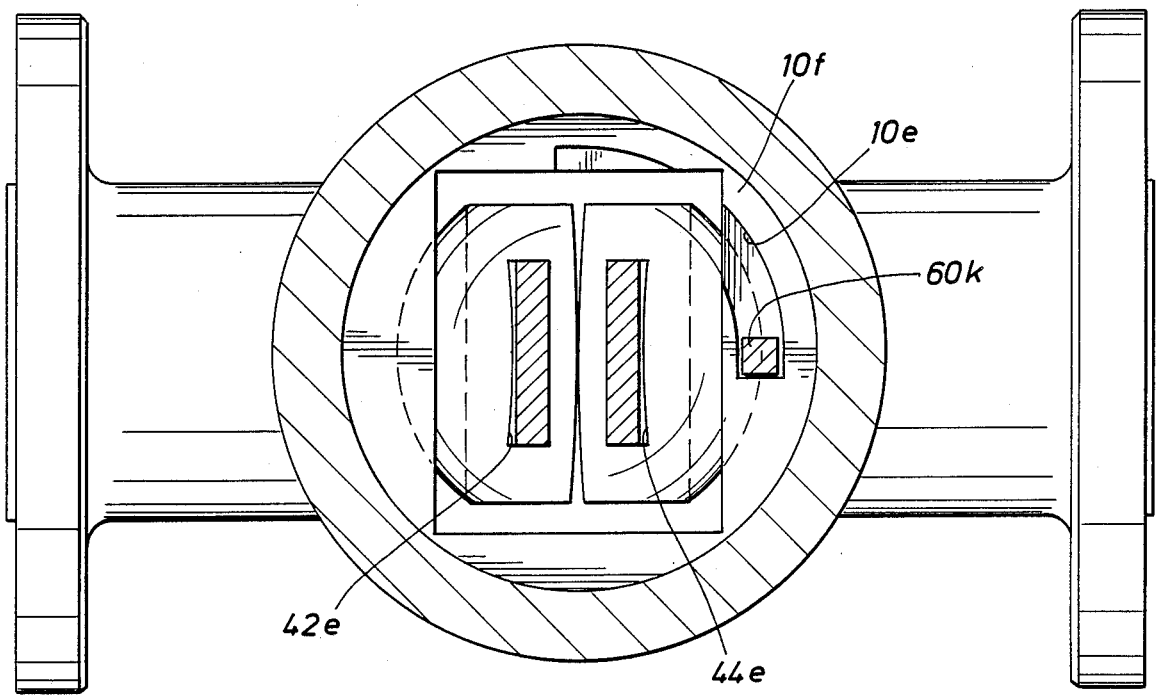
FIG. 6 is a view similar to FIGS. 4 or 5 illustrating the operable connection of the ball assembly with the actuator mechanism.

Each of the ball sections 42 and 44 are provided with key way or slots 42e and 44e, respectively, for releasably receiving key members 50 and 52 therein. If desired, the key members 50 and 52 may be formed integrally by the ball sections 42 and 44, but the illustrated arrangement is preferred. In a manner to be more fully disclosed hereinafter, the key members 50 and 52 operably impart controlled axial and rotational movement to the ball sections 42 and 44 in response to rotational movement of the stem 26. As best illustrated in FIG. 6, the key members 50 and 52 are loosely fitted in slots 42e and 44e to prevent any binding that may occur during operating movement of the ball sections 42 and 44. To further prevent binding one or both of the side walls forming the slots 50 and 52 may be tapered in the manner there illustrated. Alternately, or in addition, a lose fitting taper or tolerance may be provided on the ball section received portion of the key members 50 and 52.

To control operating movement of the ball section members 42 and 44, an operating or actuator means, generally designated C, is employed. In the illustrated embodiment, the actuator means C includes a rotatable base member 60 mounting a pair of identical guide members 62 and 64 as well previously mentioned key members 50 and 52 and stem 26. The key members 50 and 52 may be construed to form a portion of either or both of the valve closure means B or actuator means C.

As the relatively movable guide members 62 and 64 are preferably identical in construction for purposes of simplicity of manufacture, only guide member 62 will be described in detail. The guide members 62 and 64 are also interchangeable in operation and assembly. As illustrated in FIG. 7, the guide member 62 is of a general T-shape having a slide or top portion 62a and the outwardly projecting base or leg portion 62b. The leg portion 62b is provided with a downwardly facing groove 62c that operably receive and connects with the key member 50. The corresponding groove 64C in the other guide member 64 receives the other key member 52. This key connection arrangement operably connects one ball section with one guide member and the other guide section to the other ball section.

Figure 3:
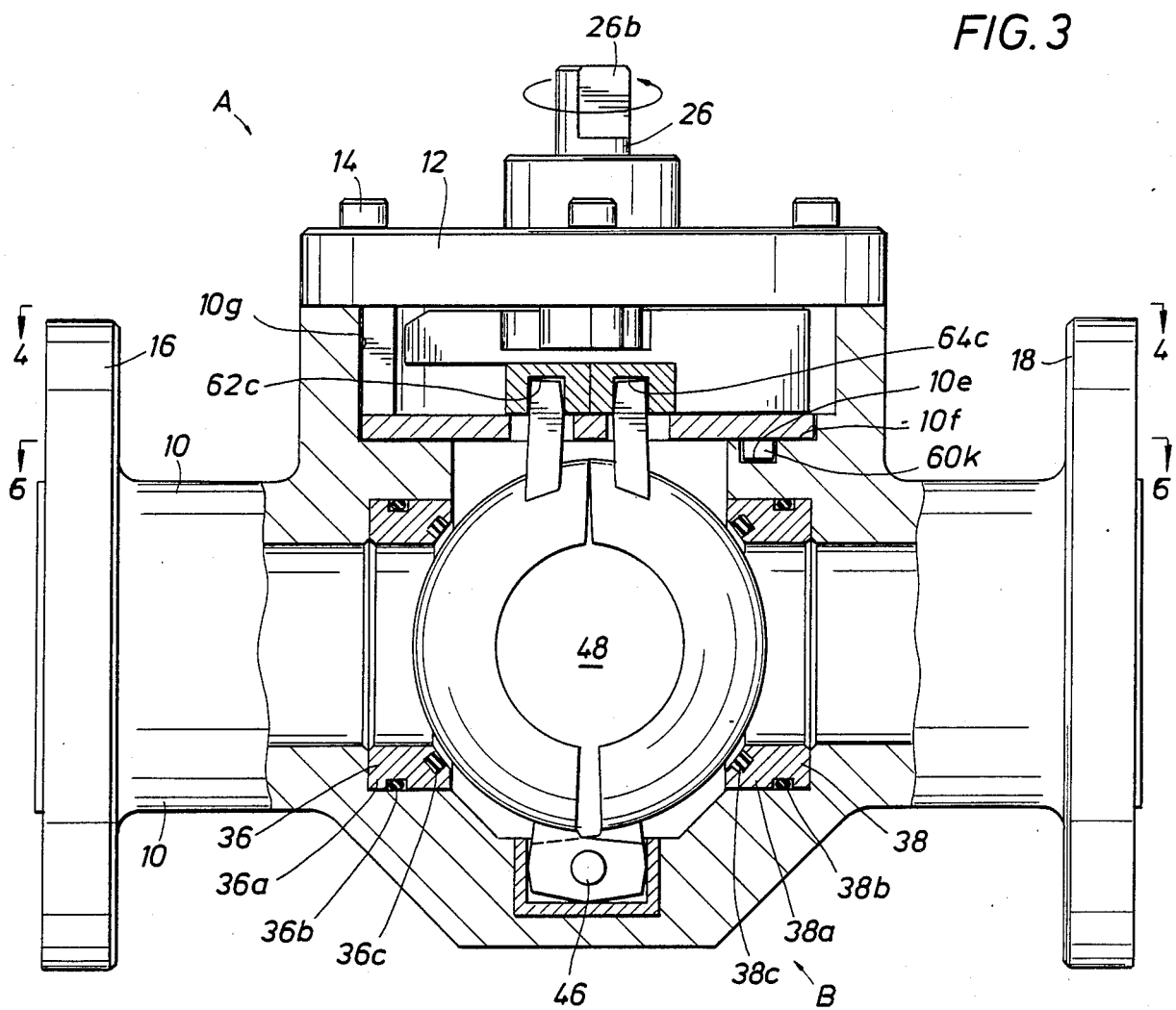
FIG. 3 is a view similar to FIG. 1 with the valve apparatus positioned in an intermediate position.
Figure 4:
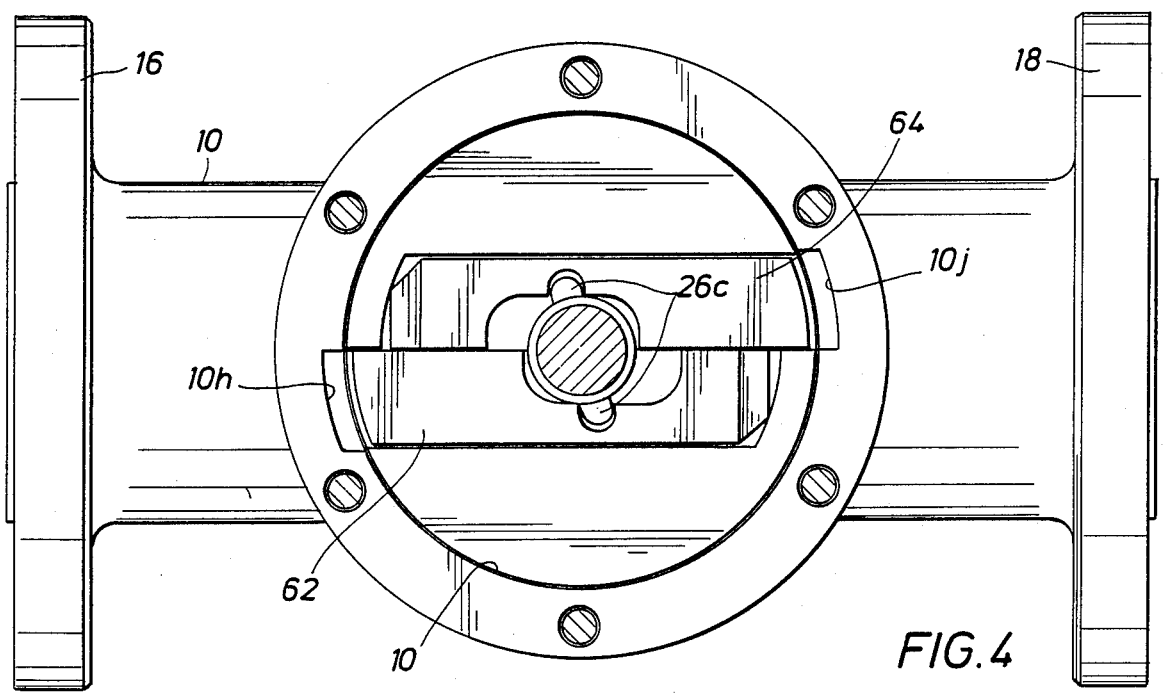
FIGS. 4 and 5 are views taken along lines 4—4 and 5—5, respectively, of FIG. 3.
Figure 5:
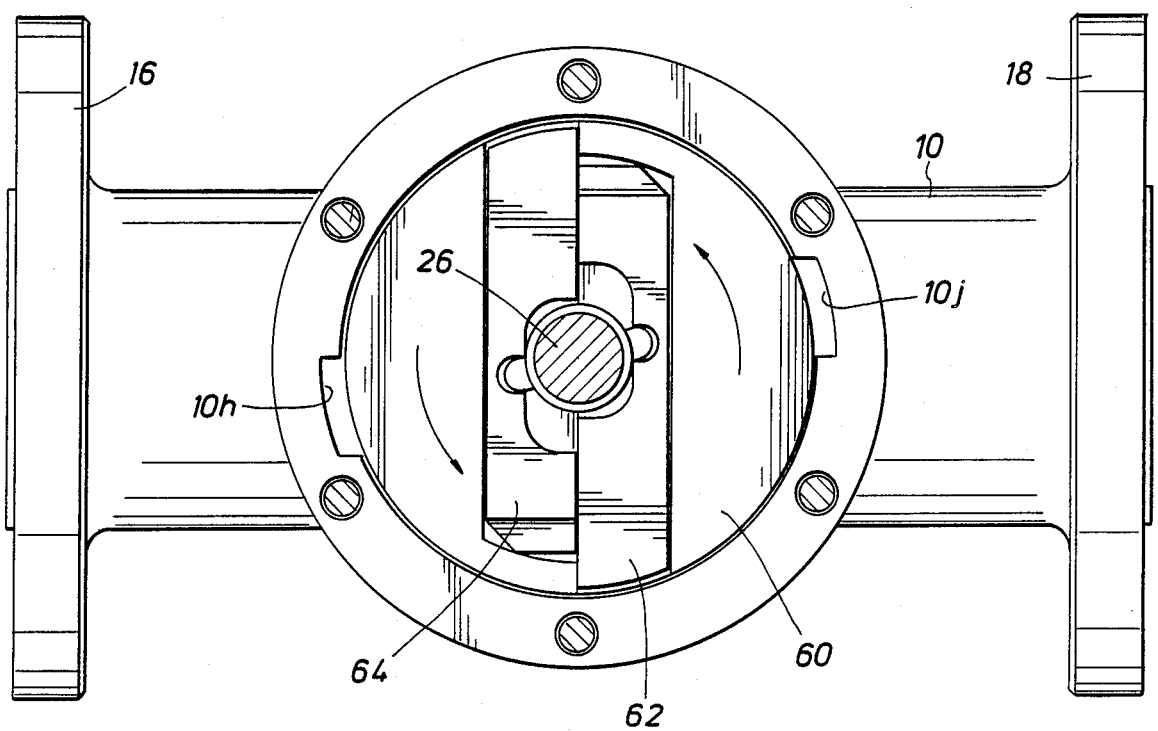

The guide member 62 is also provided with a downwardly facing on cut out or recess 62d providing relative movement enabling clearance for the leg portion 64b of the companion guide member 64 when assembled in the side by side or juxtaposed sliding relationship illustrated in FIGS. 2, 4, or 5. When assembled, the engagement of portions 62b and 64b also limits relative telescoping movement of the guide members 62 and 64 toward each other (see FIG. 3). The guide members 62 and 64 are slidably movable relative to each other between the extended condition of FIG. 2 and the shortened or retracted position or condition of FIGS. 4 and 5.

As illustrated in FIG. 7, the rotatable base member 60 is provided with a generally center diameter slot 60a having side walls 60b and 60c and a bottom wall 60d (FIG. 7). A pair of spaced windows, slots or openings 60e and 60f as shown clearly in FIG. are formed through the base member 60 to provide sufficient operating position clearance for the key members 50 and 52, respectively which extend therethrough to be received in recesses or groove 62c and 64c as illustrated in FIG. 1. The windows 60e and 60f also provide sufficient clearance for the keys 50 and 52 to enable movement of the guide members 62 and 64 between the extended and shortened positions.

The base member 60 at opposite ends of the slot 60a provides symmetrical partial end stops or end closures 60g and 60h for also limiting the sliding movement of the guide members 62 and 64. As illustrated in FIG. 5, each end closure is dimensioned to enable one of the two guide members 62 and 64 to protrude beyond the slot 60a in the extended position while positively retaining or stopping the radial protrusion of the other guide member in that direction. The end stops 60g and 60h are thus positioned on the base member 60 to permit protrusion or radial extension of one of the guide members relative to the base member 60 while blocking radial extensions in that direction by the other guide member as illustrated in the radial extended position of FIG. 2. When the guide members are in their relative retracted position or radially contracted relative to the base member 60 (FIGS. 4 and 5) the guide members 62 and 64 are fully contained or recessed within the slot 60a for enabling rotational movement of the base member 60.

To limit or control the desired arc of rotational movement of the base member 60 relative to the valve body 10 a downwardly projecting guide lug 60k is provided in base member 60 (FIG. 3). The guide lug 60k is received and operably retained in a guide groove 10e formed in a substantially flat annular support surface 10f of the valve body 10. As illustrated in FIG. 6, the guide groove 10e provides an arc of rotational movement of the base member 60 relative to the valve body 10 of substantially 90 degrees or a quarter turn. This is the conventional range of operating movement of ball valves.

To enable journaled movement of the base member relative to the valve body 10 the substantially flat annular support surface 10f loosely holds or secures the base member adjacent the bonnet 12. A substantially constant diameter vertical side wall 10g of the valve body 10 adjacent the outer peripheral surface 601 of the base member 60 provides a lateral centering support or radial journal bearing for the base member 60.

The substantially constant diameter wall 10g also serves as a cam guide and lock surface for the guide members 62 and 64. When the guide members 62 and 64 are in the radially contracted position of FIG. 5, the side wall serves as a movement stop preventing undesired relative movement to the radial extended position. To enable relative sliding movement of the guide members 62 and 64 relative to each other and to the base member 60 to the radial extended position a pair of receiving slots or recesses are formed in the constant diameter wall surfaces 10h and 10j (FIG. 5). The guide members 62 and 64 can only move to the radial extended position when the recesses 10h and 10j and guide members 62 and 64 are aligned as illustrated in FIG. 4. Once aligned, the guide members 62 and 64 can then be moved radially outwardly to the extended position illustrated in FIG. 2 (which is also the valve closed position) with guide member 62 received in recess 10h and guide member 64 received in recess 10j. This relative movement of the guide members 62 and 64 pivots the ball sections 42 and 44 about pivot pin 46.

As illustrated in FIGS. 2 and 7, each of the guide members is provided with an elongated facing slot 62e and 64e for receiving the enlarged portion 26a of the actuator stem 26 having the projecting lugs 26c and 26d. The elongated sliding movement clearance providing recesses 62e and 64e have smaller deeper recesses 62f and 64f, respectively, formed therein for receiving one of the stem lugs 26c and 26d therein. The lugs 26c and 26d and recesses 62f and 64f cooperate to impart the rotational movement of the stem 26 to the actuator means C for operating the valve apparatus A.

Counter-clockwise rotation of the stem 26 (as view in FIG. 2) will initially move the guide members 62 and 64 from the radially extended (and valve closed) position to the radial contracted (valve intermediate) position of FIG. 4. This movement also pivots the ball sections 42 and 44 about pivot pin 46 for axially moving or spacing the ball sections 42 and 44 from both of the valve seats 36 and 38 (compare FIGS. 1 and 3) for equalizing the fluid pressure in flow passages 22 and 24 and chamber 30. This movement of the ball sections 42 and 44 from the face seals 36b and 38b prevents sliding rotational contact and thereby eliminating any frictional resistance from occurring therebetween. When spaced from the seats 36 and 38, but before commencing to rotate the ball assembly 40, the valve closure means B and actuator means C are is in the intermediate position which tends to equalize any pressure differential across the valve closure means B.

Continued rotation of the stem 26 firmly engages the guide member leg portions 62b and 64b with each other and the end walls 60g and 60h of base member 60. At that occurrence, the guide members 62 and 64 are locked together with the base member 60 in order that continued rotation of the stem 26 will rotate both the valve closure means B and the actuation means C to place the valve in the open condition with flow port 48 aligned with the flow passages 22 and 24 for enabling flow.

Closing operation of the valve apparatus A is effected by rotating the stem 26 in the opposite direction. When the valve closure means B is rotated 90 degrees to the intermediate position (FIG. 4), the guide members 62 and 64 are permitted or enabled to move into recesses 10h and 10j, respectively, for moving the ball sections 42 and 44 axially into sealing engagement with both seats 36 and 38.

USE AND OPERATION OF THE PRESENT INVENTION

In the use and operation of the present invention, the valve apparatus A is assembled in the manner illustrated and connected, as desired, in a fluid flow line or conduit (not illustrated) using flanges 16 and 18 in the usual manner.

When it is desired to move the valve apparatus A from the closed position (FIG. 1) to enable flow between flow passages 22 and 24, the stem 26 is rotated. The initial increment of rotation retracts the radial extended guide members 62 and 64 from recesses 10h and 10j for moving the key containing slots 62c and 64c from the extended or spread apart condition of FIG. 1 to the compressed telescopic or side by side condition of FIG. 2. As the slots 62c and 64c move together the key members 50 and 52 pivot the ball sections 42 and 44 about pivot pin 46 for moving the sections 42 and 44 axially away from the valve seats 36 and 38. This initial increment of rotation (approximately 60° of stem turn as shown by comparing positions of the lugs 26c and 26d in FIGS. 2 and 4) also moves the ball sections 42 and 44 axially (along aligned axis of flow passages 22 and 24) away from fluid sealing engagement with the seats 36 and 38. This also enables initial flow to equalize any pressure different condition between the flow passages 22 and 24 and valve chamber 20. In operable effect, the ball assembly 40 radially contracts during this initial portion of stem 26 rotation in moving to the intermediate condition.

With the guide members 62 and 64 in the radially contracted position or relationship relative to each other and to the base member 60, continued rotation of the stem 26 rotates the base member 60 and guide members 62 and 64 through the 90° arc permitted by the body groove 10e and lug 60K to the position illustrated in FIG. 5. As the base member 60 and the guide members 62 and 64 rotate, that rotation is imparted to the ball sections 42 and 44 by key members 50 and 52. This rotational movement also rotates the ball assembly 40 from the intermediate position to the open position for aligning the flow port 48 with the flow passages 22 and 24.

To close the open valve apparatus A, it is only necessary to rotate the stem 26 in the reverse direction to rotate the ball assembly 40 to position the flow port 48 in a position traverse or perpendicular to the flow passages 22 and 24. During this movement, the base member 60 rotates 90 degrees to align guide members 62 and 64 with body recesses 10h and 10j, respectively. When so positioned, the valve closure means is in the intermediate position illustrated in FIGS. 3 and 4.

Continued rotation of the stem 26 unlocks and radially expands the guide members 60 and 62 into the aligned recess 10h and 10j of the body wall surface 10g. Radial extended movement of the guide members 62 and 64 also moves the connecting key members 50 and 52 and associated ball sections 42 to 42 to radially expand the ball assembly 40 by pivoting the ball sections about the pivot pin 46. This radial expansion of the ball assembly 40 effects non-sliding axial sealing engagement with both seats 36 and 38 to provide an upstream and downstream seal regardless of flow direction through valve apparatus A. By providing some radial clearance between the pivot pin 46 and the sockets 42c and 42d, each of the ball sections 42 and 44 are self-centering relative to the valve seats 36 and 38, respectively.

The foregoing disclosure and description of the invention are illustrative and explanatory thereof, and various changes in the size, shape and materials, as well as in the details of the illustrated construction, may be made without departing from the spirit of the invention.

What is claimed:

1. Valve apparatus for controlling the flow of fluid through a flow conduit comprising:
    a valve body having a valve chamber and opposed flow passages communicating with said valve chamber to form a fluid flow path therethrough;
    a valve closure having a central port therethrough mounted in said valve chamber for rotation between open and closed positions relative to said fluid flow path, said valve closure including a pair of opposed generally similar ball shaped hemisphere portions connected to each other adjacent one end about a pivotal connection for pivotal movement between an expanded position away from each other and a contracted position toward each other;
    an annular valve seat about each flow passage at the juncture of the flow passage with the valve chamber for selective sealing engagement with an associated ball shaped portion;
    an outwardly extending key member secured to each ball shaped hemisphere portion adjacent the other end thereof opposite said pivotal connection;
    a non-rising stem extending from said valve body and mounted for relative rotation; and
    linkage means operatively connected between said stem and the key members for rotating said ball shaped portions and moving said ball shaped portions between expanded and contracted positions during rotation of said stem, said linkage means upon rotation of the stem in one direction effecting movement of said ball shaped portions to expand position for sealing engagement with the valve seats at said closed position of the valve closure and effecting movement of said ball shaped portions to contracted position upon rotation of the stem in an opposite direction from said closed position of the valve closure;
    said linkage means including a pair of guide members mounted for movement in a lateral direction extending generally perpendicularly to the axis of rotation of said stem upon rotation of said stem adjacent the closed position of said valve closure, said guide members operatively connected between said stem and said key members for effecting rotation of said associated ball shaped portions upon rotation of said stem.

2. Valve apparatus as set forth in claim 1 wherein said linkage means includes a pair of guide members mounted for sliding axial movement in a lateral direction extending generally perpendicular to the axis of rotation of said stem upon rotation of said stem adjacent the closed position of said valve closure, said guide members connected to said stem and said key members for rotation of said key members and associated ball shaped portions upon rotation of said stem.

3. Valve apparatus as set forth in claim 1 wherein each of said ball shaped portions has an extending lug on said one end thereof opposite said stem, and said lugs interfit about said pivotal connection to form a pivot for rotation of the valve closure.

4. Valve apparatus for controlling the flow of fluid through a flow conduit comprising:
   a valve body having a valve chamber and opposed flow passages communicating with said valve chamber to form a fluid flow path therethrough;
   a valve closure having a central port therethrough mounted in said valve chamber for rotation between open and closed positions relative to said fluid flow path, said valve closure including a pair of opposed generally similar ball shaped hemisphere portions connected to each other adjacent one end about a pivotal connection for pivotal movement between an expanded position away from each other and a contracted position toward each other;
   an annular valve seat about each flow passage at the juncture of the flow passage with the valve chamber for selective sealing engagement with an associated ball shaped portion;
   an outwardly extending key member secured to each ball shaped hemisphere portion adjacent the other end thereof opposite said pivotal connection;
   a stem extending from said valve body and mounted for relative rotation; and
   linkage means operatively connected between said stem and the key members for rotating said ball shaped portions and moving said ball shaped portions between expanded and contracted positions during rotation of said stem, said linkage means upon rotation of the stem in one direction effecting movement of said ball shaped portions to expanded position for sealing engagement with the valve seats at said closed position of the valve closure and effecting movement of said ball shaped portions to contracted position upon rotation of the stem in an opposite direction from said closed position of the valve closure;
   said linkage means including a pair of guide members mounted for sliding axial movement in a lateral direction extending generally perpendicularly to the axis of rotation of said stem upon rotation of said stem adjacent the closed position of said valve closure, said guide members connected to said stem and said key members for rotation of said key members and associated ball shaped portions upon rotation of said stem.

5. Valve apparatus as set forth in claim 4 wherein each guide member has a groove therein receiving an associated key member, and said stem has a pair of opposed lugs extending laterally therefrom and engaging said guide members for movement of said guide members in a planar transverse direction upon rotation of said stem for movement of said ball shaped portions between expanded and contracted positions.

6. Valve apparatus as set forth in claim 4 wherein said valve body has a pair of generally opposed recesses therein generally adjacent said guide members at the closed position of the valve closure, said guide members having ends thereof received within said recesses adjacent the closed position of the valve closure to permit outward sliding movement of said guide members into said recesses for expanding movement of said ball shaped portions into expanded position at said closed position.

7. Valve apparatus for controlling the flow of fluid through a flow conduit comprising:
   a valve body having a valve chamber and opposed flow passages communicating with said valve chamber to form a fluid flow path therethrough;
   a valve closure having a central port therethrough mounted in said valve chamber for rotation between open and closed positions relative to said fluid flow path, said valve closure including a pair of opposed generally similar ball shaped hemisphere portions pivotally connected to each other about a pivotal connection adjacent one end for pivotal movement between an expanded position away from each other and a contracted position toward each other;
   an annular valve seat about each flow passage at the juncture of the flow passage with the valve chamber for selective sealing engagement with an associated ball shaped portion upon expansion of said ball shaped portions;
   an outwardly extending key member secured to each ball shaped hemisphere portion adjacent the other end thereof opposite said pivotal connection;
   a stem extending from said valve body and mounted for relative rotation;
   a base positioned between the stem and key members;
   a pair of guide members supported on said base and operatively connected to said key members and to said stem for transmitting rotative movement of said stem to said key members for rotation of said ball shaped portions; and
   means mounting said guide members for movement in a lateral direction perpendicular to the axis of rotation when said guide members are adjacent the closed position of the valve closure for movement of said ball shaped portions between expanded and contracted positions adjacent said closed position, said mounting means being responsive to rotation of said stem for movement of said guide members in a lateral direction.

8. Valve apparatus as set forth in claim 7 wherein said valve body has a pair of generally opposed recesses therein generally adjacent said guide members at the closed position of the valve closure, said guide members having ends thereof received within said recesses adjacent the closed position of the valve closure to permit outward sliding movement of said guide portions into said recesses for expanding movement of said ball shaped portions into expanded position and into seating relation with said valve seats.

9. Valve apparatus as set forth in claim 7 wherein each guide member has a groove therein receiving an associated key member, and said stem is connected to said guide members for actuation of said guide members in rotational and axial movements upon rotation of said stem.

* * * * *